United States Patent [19]

Bellamy

[11] 3,897,583

[45] July 29, 1975

[54] ADHESION OF METAL TO RUBBER

[75] Inventor: Carlos Bellamy, Distrito Federal, Mexico

[73] Assignee: Uniroyal, S.A., Distrito Federal, Mexico

[22] Filed: Nov. 8, 1973

[21] Appl. No.: 414,052

[52] U.S. Cl. .............. 428/256; 156/124; 156/306; 156/334; 156/335; 260/3; 260/845; 428/462; 428/465
[51] Int. Cl.². B32B 15/02; B32B 15/06; B60C 9/02
[58] Field of Search ........ 161/217, 221; 260/3, 845; 156/306, 335, 334, 124

[56] References Cited
UNITED STATES PATENTS

| | | | |
|---|---|---|---|
| 3,446,874 | 5/1969 | Varker | 156/334 X |
| 3,503,845 | 3/1970 | Hollatz et al. | 161/188 X |
| 3,514,370 | 5/1970 | Canevari | 161/217 |
| 3,751,331 | 8/1973 | Dane et al. | 161/217 X |
| 3,756,969 | 9/1973 | Danielson | 156/334 X |
| 3,847,727 | 11/1974 | Kindle et al. | 161/217 X |

*Primary Examiner*—Harold Ansher
*Attorney, Agent, or Firm*—James J. Long

[57] ABSTRACT

Adhesion of rubber to metal (e.g., brass plated wire tire cord) is improved by incorporating a cobalt salt (e.g., cobalt naphthenate) into a rubber stock containing an adhesive resin forming system, particularly a methylolated nitroalkane (methylene donor) and a resorcinol type methylene acceptor, prior to vulcanizing the rubber in contact with the metal.

7 Claims, No Drawings

ADHESION OF METAL TO RUBBER

This invention relates to the adhesion of metal to rubber.

It has been proposed to employ certain methylene donors, represented by 1-aza-5-methylol-3-dioxabicyclo[3.3.0] octane, in combination with methylene acceptors, such as resorcinol, to improve the adhesion of rubber to metal by in-situ formation of resin, as disclosed in U.S. Pat. No. 3,517,722, Endter et al., June 30, 1970. Endter et al. stress that resin-forming ingredients other than those specified produce detrimental by-products which destroy the adhesive bond to metal.

In accordance with the invention it has now been found that remarkably improved adhesion of rubber to metal is obtained when the rubber stock contains (I) a cobalt salt, such as cobalt naphthenate, and (II) a resin-forming system based on (A) a methylene donor which is a methylolated nitroalkane, in combination with (B) a resorcinol type methylene acceptor. The surprising superior ability of methylolated nitroalkane to improve the adhesion of rubber to metal in the described system could not have been foreseen from the known use of methylolated nitroalkane in adhering certain textiles to rubber as in U.S. Pat. Nos. 3,364,100, Danielson, Jan. 16, 1968 and 3,503,845, Hollatz et al., Mar. 31, 1970.

The cobalt salts (I) employed in the invention include cobalt salts of various organic acids, notably aliphatic or alicyclic carboxylic acids having from 6 to 30 carbon atoms, such as cobalt octoate, cobalt stearate, cobalt napthenate, and the like. Ordinarily only a small amount of cobalt salt, sufficient to provide say from about 0.01 parts or less to about 0.2 part or more of cobalt, per 100 parts by weight of rubber, is incorporated in the rubber for purposes of the invention.

The resin-forming system (II) incorporated in the rubber along with the cobalt salt (I) in accordance with the invention is, as indicated, based on a methylolated nitroalkane (A) as the methylene donor and a resorcinol type methylene acceptor (B). The methylolated nitroalkanes (A) may be generically defined as methylolated nitroalkanes wherein the hydrocarbon radical has 1 to 6 carbon atoms. Examples are: trimethylolnitromethane, 1,1-dimethylol-1-nitroethane, 1,1-dimethylol-1-nitropropane, 2-methylol-2-nitropropane, tris(acetoxymethyl)nitromethane, 1,1-bis(acetoxymethyl)-1-nitroethane and 1,1-bis(acetoxymethyl)-1-nitropropane.

Usually from about 0.1 part or less to about 5 parts or more of methylolated nitroalkane is added to 100 parts by weight of the rubber.

The resorcinol type methylene acceptors (B) incorporated in the rubber stock along with the cobalt salt and methylolated nitroalkane include: resorcinol or other meta disubstituted benzene in which each of the substituents is an OH, $NH_2$ or $OCOCH_3$ (e.g., m-aminophenol, m-phenylenediamine, resorcinol monoacetate, resorcinol diacetate), or 1,5-napthalenediol, or a fusible partially reacted resorcinol-carbonyl compound (having from 1 to 6 carbon atoms) resin, such as resorcinol-formaldehyde resin (condensate of resorcinol and formaldehyde in the ratio of 1 mole of resorcinol to about 0.5 to 0.8 mole of formaldehyde), or a condensation product of resorcinol and acetone (condensate of resorcinol and acetone in the ratio of one mole or resorcinol to about 0.5 to 2 moles of acetone), or a condensation product of resorcinol and acetaldehyde (condensate of resorcinol and acetaldehyde in the ratio of one mole of resorcinol to about 0.5 to 1 mole of acetaldehyde), or a condensation product of resorcinol and formaldehyde and butyraldehyde. Such fusible partially reacted resorcinol-formaldehyde resins may be prepared in known manner by heating a concentrated aqueous solution of the resorcinol and formaldehyde, with or without a catalyst such as oxalic acid. The ball and ring softening point (ASTM Designation E28–58T) of such fusible partially reacted resins will generally be from about 60° to 120°C. Such resorcinol-acetone condensates, which are white powders, may be prepared in known manner by reacting the acetone and resorcinol in dilute hydrochloric acid solution at temperatures from 35° to 50°C. for several hours. Such resorcinol-acetaldehyde condensates, which are tacky reddish oils, may be prepared in known manner by reacting the acetaldehyde and resorcinol in dilute oxalic acid solution at 100°C., for several hours (see U.S. Pat. No. 3,266,970, Paul, Aug. 16, 1966). Usually the amount of resorcinol type methylene acceptor incorporated in the rubber is from about 0.1 part or less to about 5 parts or more per 100 parts by weight of rubber. Preferred methylene acceptors include the condensates of resorcinol with an alkyl aldehyde having 1 to 4 carbon atoms (e.g., formaldehyde, acetaldehyde, propionaldehyde, n-butyraldehyde, and isobutyraldehyde).

The solid rubber used in the present invention for making rubber and metal laminates for use in tire manufacture and for other purposes may be natural (Hevea) rubber (which is essentially a polymer of the conjugated diolefin, isoprene) or conjugated diolefin polymer synthetic rubber or mixtures of any of them including their reclaims. Such conjugated diolefin polymer synthetic rubbers are homopolymers of butadienes-1,3, e.g., butadiene-1,3, isoprene, 2,3-dimethyl-butadiene-1,3 and copolymers of mixtures thereof, and copolymers of mixtures of one or more such butadienes1,3 for example, up to 75% by weight of such mixtures of one or more monoethylenic compounds which contain a $CH_2$=C< group where at least one of the disconnected valences is attached to an electronegative group, that is, a group which substantially increases the electrical dissymmetry or polar character of the molecule. Examples of compounds which contain a $CH_2$=C< group and are copolymerizable with butadienes-1,3 are aryl olefins, such as styrene, vinyl toluene, alpha-methylstyrene, chlorostyrene, dichlorostyrene, vinyl napthalene; the alpha methylene carboxylic acids and their esters, nitriles and amides, such as acrylic acid, methyl acrylate, ethyl acrylate, methyl methacrylate, acrylonitrile, methacrylonitrile, methacrylamide; vinylpyridines, such as 2-vinylpyridine, 2-methyl-5-vinylpyridine; methyl vinyl ketone, methyl isopropenyl ketone. Examples of such conjugated diolefin polymer synthetic rubbers are polybutadiene, polyisoprene, butadiene-styrene copolymers (SBR) and butadiene-acrylonitrile copolymers. The rubber may be solution-prepared or emulsion-prepared, stereo-specific or otherwise.

The rubber stock will also contain conventional compounding and vulcanizing ingredients such as carbon black, silica, or other filler, rubber processing or softening oil which may be added as such or may be present from oil-extended rubber, antioxidant, sulfur or sulfur-donating curative, zinc oxide and accelerator of sulfur vulcanization.

The adhesive ingredients are incorporated into at least the portion of the vulcanizable rubber stock compounded for sulfur vulcanization adjacent to the interface of the metal element and the rubber coating before vulcanization. The vulcanizable rubber stock containing adhesive ingredients may serve as a "tie gum" between the metal element and the remainder of the rubber body, which need not necessarily contain the adhesive ingredients.

In practicing the invention the rubber is mixed with the usual vulcanizing and other compounding ingredients appropriate to the particular article being manufactured (e.g., pneumatic tire, conveyor belt, hose) along with the cobalt salt (I) and adhesive-resin forming ingredients (II), that is, the methylolated nitroalkane (A) and resorcinol-type methylene acceptor (B). The stock is then laminated or coated (e.g., by calendering, extrusion, etc.) onto the metal reinforcement, which is frequently in the form of wire, as in wire tire fabric (e.g., for use as breaker, belt or carcass plies, including radial plies) or tire bead wire. The resulting assembly or laminate is fabricated or shaped and cured as in conventional practice appropriate to the specific article being manufactured. The adhesive bond is developed at elevated temperature during the curing or vulcanizing step.

While brass plated steel wire is the wire commonly used, the invention is applicable to other metals such as are disclosed in U.S. Pat. No. 3,517,722 referred to above, especially column 5, line 17 to column 6, line 23.

The following example will serve to illustrate the practice of the invention in more detail.

EXAMPLE

An example of suitable metal reinforcement for use in the invention is wire tire cord of a 5 × 7 × 0.0058 inch over twisted 3 × 1 × 1 construction commonly employed in making the plies of a pneumatic tire. The surface of each strand is coated with brass (an alloy of 70% copper and 30% zinc ± 5%) at the rate of 5.5 grams of brass per kilogram of steel ± 1.5 grams.

A suitable rubber stock may be prepared by mixing 30 parts of natural rubber, 25 parts of cis-polybutadiene rubber (95% cis content), 67.5 parts of oil-extended styrene-butadiene rubber (made up of 45 parts of copolymer containing 23% styrene and 22.5 parts of naphthenic petroleum hydrocarbon extender oil), 60 parts of carbon black, 5 parts of zinc oxide, 1.5 parts of stearic acid, 10 parts of naphthenic petroleum hydrocarbon process oil and 1 part of an antioxidant, namely, a reaction product of diphenylamine and diisobutylene. To this masterbatch may be added 0.7 part of N-t-butyl-2-benzothiazole sulfenamide, 0.2 part of diphenyl guanidine and 2 parts of sulfur.

Adhesion test samples may be prepared and tested according to a procedure such as is described in U.S. Pat. No. 3,707,178, Miller et al., Dec. 26, 1972, col. 6, lines 35–67.

Using a basic recipe such as described above, a series of stocks may be prepared, containing various adhesion promoting additives as noted in Table I. In Table I the amount of each additive is expressed as parts per 100 parts by weight of rubber in the stock. The stocks are formed into adhesion test specimens using wire as described above, and cured for about 8 minutes at 350°F. in a mold. Adhesion tests conducted as noted above at 250°F. produce results as set forth in Table I. Stock A, which is outside the invention, represents a control having no adhesive additive other than 2-methylol-2-nitropropane and resorcinol-acetaldehyde resin (prepared as described in Example I of U.S. Pat. No. 3,266,970 referred to above) as a resorcinol-type methylene acceptor. Stock B represents the practice of the invention and contains, in addition to the resorcinol-acetaldehyde resin, 0.07 phr (parts per hundred of rubber) of cobalt (as cobalt naphthenate preparation) and 1.5 phr of 2-methylol-2-nitropropane. To facilitate dispersion of the cobalt naphthenate in the rubber stock, it may be dissolved in pine tar (for example by mixing 100 parts of the 10% cobalt commercial preparation with 43 parts of pine tar at 80°–90°C. to provide a solution containing 7% cobalt).

TABLE I

| Additive | Adhesive Additives and Adhesion Test Results Stock: | A | B |
|---|---|---|---|
| Cobalt* | | — | 0.07 |
| 2-Methylol-2-nitropropane | | 1.5 | 1.5 |
| Resorcinol-acetaldehyde resin | | 1.0 | 1.0 |
| Adhesion pull (pounds) | | 33 | 53 |
| Appearance rating | | 1 | 5 |

*As cobalt naphthenate composition containing 7% cobalt.

Table I shows the remarkable improvement in adhesion made possible by the invention (Stock B), as evidenced by increased pull necessary to separate the wire from the rubber in the cured laminate, and especially by the increased appearance rating (a rating of 5 indicating that the wire as pulled from the test laminate was covered with rubber, signifying failure in the stock rather than failure of the adhesive bond at the metal-rubber interface).

I claim:

1. A method of adhering brass plated wire reinforcement to rubber which comprises applying a solid vulcanizable rubber composition, comprising a conjugated diolefin polymer rubber, said composition containing, per 100 parts by weight of said rubber, from 0.01 to 0.2 part by weight of cobalt in the form of a cobalt salt (I), and (II) a resin-forming system comprising from 0.1 to 5 parts by weight of (A) a methylene donor which is a methylolated nitroalkane in which the hydrocarbon radical has 1 to 6 carbon atoms and from 0.1 to 5 parts by weight of (B) a resorcinol-type methylene acceptor, to the wire reinforcement to coat the same, and heating the assembly to vulcanize the rubber and to firmly adhere the wire reinforcement to the vulcanized rubber composition, the said cobalt salt (I) being a cobalt salt of an aliphatic or alicyclic carboxylic acid having from 6 to 30 carbon atoms, and the said methylene acceptor (B) being a fusible partially reacted resorcinol-alkyl aldehyde resin in which the alkyl aldehyde has from 1 to 4 carbon atoms.

2. A method as in claim 1 in which the said cobalt salt (I) is selected from the group consisting of cobalt octoate, cobalt stearate and cobalt naphthenate, (A) is 2-methylol-2-nitropropane and the alkyl aldehyde in (B) is acetaldehyde.

3. A method as in claim 2 in which the wire reinforcement is wire tire cord and the rubber composition is tire carcass stock.

4. A method as in claim 3 in which the cobalt salt is cobalt naphthenate.

5. A laminate of brass plated wire tire cord fabric and a vulcanized rubber tire carcass stock, said stock being a conjugated diolefin polymer rubber containing, per 100 parts by weight of rubber, (I) from 0.01 to 0.2 parts by weight of cobalt in the form of a cobalt salt of an organic acid selected from the group consisting of cobalt octoate, cobalt stearate and cobalt napthenate, and (II) a resinous reaction product of (A) from 0.1 to 5 parts by weight of a methylene donor which is a methylolated nitroalkane in which the hydrocarbon radical has 1 to 6 carbon atoms and (B) from 0.1 to 5 parts by weight of a resorcinol-type methylene acceptor which is a resorcinol-alkyl aldehyde condensate wherein the alkyl aldehyde has from 1 to 4 carbon atoms.

6. A laminate as in claim 5 in which the cobalt salt is cobalt naphthenate.

7. A laminate as in claim 6 in which (A) is 2-methylol-2-nitropropane and (B) is resorcinol-acetaldehyde resin.

* * * * *